United States Patent
Wuensch et al.

(10) Patent No.: US 12,115,662 B2
(45) Date of Patent: Oct. 15, 2024

(54) ROBOT HAVING AT LEAST ONE COVERING AND AT LEAST ONE CONTACT SENSOR

(71) Applicant: KUKA Deutschland GmbH, Augsburg (DE)

(72) Inventors: Markus Wuensch, Augsburg (DE); Veronika Zumpe, Augsburg (DE)

(73) Assignee: KUKA Deutschland GmbH (DE)

( * ) Notice: Subject to any disclaimer, the term of this patent is extended or adjusted under 35 U.S.C. 154(b) by 637 days.

(21) Appl. No.: 17/429,008

(22) PCT Filed: Feb. 4, 2020

(86) PCT No.: PCT/EP2020/052741
§ 371 (c)(1),
(2) Date: Aug. 6, 2021

(87) PCT Pub. No.: WO2020/161129
PCT Pub. Date: Aug. 13, 2020

(65) Prior Publication Data
US 2022/0203563 A1    Jun. 30, 2022

(30) Foreign Application Priority Data
Feb. 6, 2019  (DE) ...................... 10 2019 201 516.6

(51) Int. Cl.
*B25J 19/00*   (2006.01)
*B25J 9/16*    (2006.01)
*B25J 19/06*   (2006.01)

(52) U.S. Cl.
CPC ........... *B25J 19/063* (2013.01); *B25J 9/1674* (2013.01)

(58) Field of Classification Search
CPC ........ B25J 19/02; B25J 13/086; B25J 13/084; B25J 19/0029; B25J 19/0075; B25J 19/06;
(Continued)

(56) References Cited

U.S. PATENT DOCUMENTS

| 6,801,112 B1 | 10/2004 | Saxer | |
| 2005/0103148 A1* | 5/2005 | Inoue | B25J 19/021 74/490.02 |

(Continued)

FOREIGN PATENT DOCUMENTS

| DE | 19540202 A1 | 6/1996 |
| DE | 19917212 A1 | 11/2000 |

(Continued)

OTHER PUBLICATIONS

European Patent Office; Search Report in related International Patent Application No. PCT/EP2020/052741 dated May 15, 2020; 5 pages.

(Continued)

*Primary Examiner* — Truc M Do
(74) *Attorney, Agent, or Firm* — Dorton & Willis, LLP (57) ABSTRACT

A robot includes a robot arm having a plurality of motor-driven joints and a plurality of links, each of which interconnect two adjacent joints. At least one of the links has a supporting structural component configured to transmit forces and/or torques from an adjacent joint to the other adjacent joint. The structural component is provided with at least one covering that at least partially covers the structural component and at least one contact sensor. The at least one contact sensor is configured as a switching strip arranged between the structural component and the covering. Movable mounting of the covering on the structural component, which mounting is spring-preloaded into the basic position (Continued)

of the covering, is adjusted by an inherent elasticity of the switching strip.

15 Claims, 6 Drawing Sheets

(58) Field of Classification Search
CPC ........ B25J 19/063; B25J 5/007; B25J 9/1664; B25J 13/081; B25J 13/082; B25J 13/085; B25J 13/088; B25J 15/00; B25J 18/00; B25J 19/021; B25J 19/023; B25J 19/026; B25J 5/02; B25J 9/0009; B25J 9/0015; B25J 9/06; B25J 9/102; B25J 9/1602; B25J 9/1617; B25J 9/162; B25J 9/1625; B25J 9/1633; B25J 9/1666; B25J 9/1669; B25J 9/1679; B25J 9/1694; B25J 9/1697; B25J 11/0085; B25J 13/087; B25J 15/0009; B25J 15/08; B25J 19/0004; B25J 19/0091; B25J 19/028; B25J 19/065; B25J 19/066; B25J 9/0003; B25J 9/0084; B25J 9/0087; B25J 9/1025; B25J 9/1075; B25J 9/142; B25J 9/1612; B25J 9/163; B25J 9/1674; B25J 9/1676
See application file for complete search history.

(56) References Cited

U.S. PATENT DOCUMENTS

| | | |
|---|---|---|
| 2006/0214515 A1 | 9/2006 | Pullmann et al. |
| 2016/0193731 A1 | 7/2016 | Sattler et al. |
| 2018/0326576 A1* | 11/2018 | Riedel .................... B25J 19/022 |
| 2018/0370047 A1* | 12/2018 | Becciani .................. B25J 19/02 |
| 2019/0248020 A1* | 8/2019 | Yoon .................... H03K 17/962 |
| 2019/0248030 A1 | 8/2019 | Matsuda et al. |

FOREIGN PATENT DOCUMENTS

| | | |
|---|---|---|
| DE | 10322866 B3 | 5/2004 |
| DE | 10348884 A1 | 5/2005 |
| DE | 102012100404 A1 | 7/2013 |
| DE | 102015200355 B3 | 1/2016 |
| DE | 102015208222 B3 | 9/2016 |
| DE | 102017218229 A1 | 4/2019 |
| EP | 2732940 A2 | 5/2014 |
| EP | 3246137 A1 | 11/2017 |
| JP | S6016394 A | 1/1985 |
| WO | 2018079772 A1 | 5/2018 |

OTHER PUBLICATIONS

German Patent Office; Search Report in related German Patent Application No. 10 2019 201 516.6 dated Jun. 9, 2020; 5 pages.

* cited by examiner

ROBOT HAVING AT LEAST ONE COVERING AND AT LEAST ONE CONTACT SENSOR

CROSS-REFERENCE TO RELATED APPLICATIONS

This application is a national phase application under 35 U.S.C. § 371 of International Patent Application No. PCT/EP2020/052741, filed Feb. 4, 2020 (pending), which claims the benefit of priority to German Patent Application No. DE 10 2019 201 516.6, filed Feb. 6, 2019, the disclosures of which are incorporated by reference herein in their entirety.

TECHNICAL FIELD

The invention relates to a robot comprising a robot arm provided with a plurality of motor-driven joints and a plurality of links, each of which interconnect two adjacent joints of these driven joints. At least one of these links has a supporting structural component that is designed to transmit forces and/or torques from an adjacent joint to the other adjacent joint. The structural component is provided with at least one covering, which at least partially covers the structural component, and at least one contact sensor.

BACKGROUND

EP 3 246 137 A1 describes a robot and specifically a structural component that is covered by a covering, wherein a plurality of deformation layers as well as a capacitive sensor and a piezo sensor are sandwiched between the structural component and the covering.

SUMMARY

The object of the invention is to further develop a robot, in particular to provide at least one structural component of the robot arm of the robot with a collision detection device that is particularly simple and yet very reliable.

The object is achieved by a robot with a robot arm provided with a plurality of motor-driven joints and a plurality of links, each of which interconnect two adjacent joints of these driven joints, wherein at least one of these links has a supporting structural component that is designed to transmit forces and/or torques from an adjacent joint to the other adjacent joint, wherein the structural component is provided with at least one covering, which at least partially covers the structural component, and at least one contact sensor and wherein the at least one contact sensor is designed as a switching strip arranged between the structural component and the covering, and a movable mounting of the covering on the structural component, which mounting is spring-preloaded into the basic position of the covering, is adjusted by an inherent elasticity of the switching strip.

Depending on the embodiment, the invention offers an enclosure for robots which also integrates contact sensors into the robot in a simple manner. One advantage can be the quick and uncomplicated assembly and disassembly of the coverings on the robot structure and the fact that the sensor system does not require any additional spring elements. Depending on the design, the overall system then has a simple structure as well. Another advantage can be that different actuation/triggering forces can be implemented with inexpensive contact sensors, in particular switching strips, which makes it possible to modularly adjust the sensitivity of the robot in the corresponding axes, orientations and/or regions in a simple manner. Using a multiple arrangement and a sensible geometric design of the coverings, it is also possible to perform a multi-axis collision detection, preferably with a one-dimensional contact sensor. Another advantage can be that, when using the solution presented, it is even possible to dispense with a separate guide between the robot structure and the covering. Even though the coverings, the one-dimensional contact sensors and the switching strips, according to the invention, are described in connection with structural components of a robot arm, this does not mean that the structural components must be part of a human-like arm. Rather, the coverings, the one-dimensional contact sensors and the switching strips, according to the invention, can be provided on structural components of any robot, as far as this makes sense from a design perspective.

If a separate guide between the robot structure and the covering is dispensed with, the at least one contact sensor, in particular the at least one switching strip, takes on the function of a guide element. It is particularly advantageous in such an arrangement that the switching strip itself provides the necessary spring properties for the preload as well. As a result of this arrangement, the overall structure is designed to be simple, and the at least one covering of the robot structure can be easily and quickly installed and uninstalled again, for example, for service and repair purposes. If the switching strips are thus also used as guide elements, there are two basic options for arranging these sensor elements. In the corresponding embodiments, in particular as shown in the figures of the invention, collisions can be detected in at least two axes.

Separate spring elements can be omitted because the at least one contact sensor is designed as a switching strip arranged between the structural component and the covering, and a movable mounting of the covering on the structural component that is spring-preloaded into the basic position of the covering is adjusted by an inherent elasticity of the switching strip. In addition, the spring force of the covering mounted on the structural component can be adjusted by the number, position, orientation and shape of the switching strips, the covering and/or the structural component.

The sensor can be a collision sensor. Alternatively or in addition, however, the sensor can also have a different function. Using the functional principle according to the invention presented, a human-robot interaction can take place and the user can, for example, guide the robot manually and, in that case, either alternatively or in addition to the collision function, the switching strips can then be used to detect a signal as an input command because the covering is touched, for example, by a hand or a finger of a user.

The covering can comprise a central wall portion which is designed to cover a first surface of the structural component and comprises at least two side wall portions that delimit the central wall portion from opposite sides, wherein at least a first side wall portion of the covering partially or completely overlaps a second surface of the structural component and at least a second side wall portion of the covering partially or completely overlaps a third surface of the structural component, which is opposite the second surface of the structural component, and the second surface of the structural component comprises at least one first projection which cooperates with a first undercut on the inside of the first side wall portion of the covering in order to keep the covering spring-preloaded in its basic position on the structural component to prevent it from detaching from the structural component, and/or the third surface of the structural component comprises at least one second projection which cooperates with a second undercut on the inside of the second side wall portion of the covering in order to hold the covering spring-preloaded in its basic position on the structural component to prevent it from detaching from the structural component.

In the arrangement of the covering mounted on the structural component, the covering presses elastic portions of the switching strip together by a degree that is smaller than a degree that would electrically trigger the switching strip. When the covering is resiliently mounted on the structural component and, accordingly, the at least one switching strip is elastically pre-deformed, in particular elastically compressed, the switching strip is not yet triggered electrically. Rather, a residual distance remains, i.e., a residual deformability on the switching strip is maintained, when the covering is resiliently mounted on the structural component, so that, in the event of a collision, the covering can also be moved (against the preload) in order to then trigger the switching strip.

The first projection of the structural component can be formed by a first guide element that is integrally formed on the structural component or by a separately formed first guide element that is fastened to the structural component, wherein the first undercut of the covering encompasses the first guide element that is formed by a first bent portion or a first groove of the first side wall portion, and/or the second projection of the structural component can be formed by a second guide element that is integrally formed on the structural component or a separately formed second guide element that is fastened to the structural component with the second undercut of the covering encompassing the second guide element being formed by a second bent portion or a second groove of the second side wall portion.

A particularly reliable embodiment is achieved when the guide elements are molded directly onto the structural component. This eliminates the risk that the guide elements can become detached from the structural component, which is not desired. Separately designed guide elements fastened to the structural component have the advantage that existing robot arms, i.e., existing structural components (which have no guide elements molded on them), can be retrofitted with such guide elements.

The first projection of the structural component can be formed by a first switching strip fastened to the structural component, wherein the first undercut of the covering encompassing the first switching strip is formed by a first bent portion of the first side wall portion, and/or the second projection of the structural component can be formed by a second switching strip fastened on the second switching strip with the second switching strip encompassing the second undercut of the covering being formed by a second bent portion of the second side wall portion.

In this embodiment, preferably no machining of the robot structure, i.e., the respective structural component, is required. The switching strips are fastened directly to the structural component. This can be done, for example, via an adhesive connection. The shape of the covering is preferably chosen in such a way that it can be placed around the structural component of the robot arm like a kind of sheath, at least in the regions where the switching strips are fastened. When installing the covering, the switching strips can be compressed, for example, in the x-direction and the y-direction by a degree as described above, as a result of which the necessary preloading force is generated. The value for the offset between the covering and the structural component can be selected on the basis of the actuation force desired for the switching strip for a collision detection in the x-direction. If the offset is smaller, the preloading force between the covering and the structural component increases and thus the force required to trigger the sensor decreases. If, for example, due to its cross-sectional shape and/or its compression behavior, the switching strip has a degressive spring behavior (similar to a disc spring), both the actuation force and the actuation travel can be varied via the preload. Thus, the actuation force can be reduced by a higher preload. The switching strip can therefore have a spring behavior that is similar to that of a plate spring.

The position of the switching strips can be changed in order to vary the preload-dependent sensitivity in the y-direction. If the spring preload is increased, the distance that has to be overcome in order to actuate the sensor element is decreased. If an undercut is provided on the covering, said undercut ensures that the switching strips are triggered if the covering was to be knocked off due to a collision. Thus, for example, the robot stops when this happens.

The first switching strip and/or the second switching strip can be connected to a control device of the robot, which is designed to generate a signal that indicates an error status when the covering becomes detached from the structural component, and in the process, the first bent portion of the first side wall portion of the covering actuates the first switching strip, and/or the second bent portion of the second side wall portion of the covering actuates the second switching strip. In such an embodiment, the switching strips are not only used to detect a contact, a manual movement, a manual actuation and/or a collision on the basis of the pressure against the covering but also serve as a safety device which is able to detect an accidental detachment of the covering from the structural component by using the same sensors, i.e., precisely these switching strips.

The covering can comprise a central wall portion which is designed to cover a first surface of the structural component and has at least two side wall portions that delimit the central wall portion from opposite sides, wherein at least a first side wall portion of the covering partially or completely overlaps a second surface of the structural component, and at least a second side wall portion of the covering partially or completely overlaps a third surface of the structural component which is opposite the second surface of the structural component, and the second surface of the structural component comprises a first undercut which cooperates with a first projection formed by a first switching strip on the inside of the first side wall portion of the covering in order to keep the covering spring-preloaded in its basic position on the structural component to prevent it from detaching from the structural component, and/or the third surface of the structural component comprises at least a second undercut which cooperates with a second projection formed by a second switching strip on the inside of the second side wall portion of the covering in order to hold the covering spring-preloaded in its basic position on the structural component to prevent it from detaching from the structural component.

In this configuration, the switching strips are fastened directly to the covering. This can be done, for example, via an adhesive or clamp connection. If the switching strips are mounted on the covering, the covering together with the switching strips only need to be guided over the structural component. Here, too, the offset between the structural component and the covering can be used to define to what degree the switching strips are compressed and thus preloaded during the assembly. It is important in this regard that the distance to the preload remains smaller than the distance that has to be overcome when the switching strips are actuated from the idle state. As a result of the preloading force, the covering rests securely on the robot structure, i.e., the structural component, even without an additional guide element. To also be able to detect when the covering becomes detached from the robot structure due to a collision, either an undercut can be provided on the structural component or, preferably, a small additional element can be attached, for example, by gluing. This element actuates the switching strip if the covering were to become detached from the structural component and the robot stops. A mounting bevel on the additional element or on the undercut of the structural component makes it possible for the covering to be easily mounted on the structural component.

The first switching strip and/or the second switching strip can be connected to a control device of the robot, which is designed to generate a signal that indicates an error status when the covering is detached from the structural component, and thus the first undercut of the second surface of the structural component actuates the first switching strip of the covering, and/or the second undercut of the third surface of the structural component actuates the second switching strip of the covering.

In all embodiment variants, the at least one switching strip can be designed as an electro-mechanical switch, which comprises at least one electrical conductor that is embedded in an electrically insulating profile made of an elastic material. Thus, in a first embodiment, the profile can comprise two conductors which are arranged parallel to one another at a distance from one another and which extend longitudinally through the profile. In this first embodiment, an electrical circuit is closed when the profile is compressed until the two conductors make electrical contact. In a second embodiment, a single electrical conductor can extend through the longitudinal extension of the profile with this one conductor being formed from a serial chain of a plurality of microswitches. In this second embodiment, an electrical circuit is opened when the profile is compressed until one of the microswitches opens. In order to ensure a safe operation and to be able to detect or rule out a failure, there is also the possibility that a low electrical current or voltage is applied to the switching strip during the entire operation. If the switching strip is actuated, the monitored value changes and a collision can be inferred. However, if no current or voltage is measured at all, it can be concluded that the switching strips are malfunctioning. This way, it can be ensured that the switching strips are operational and work properly at all times.

The covering can comprise a central wall portion, which is designed to cover a first surface of the structural component, and comprises at least two side wall portions delimiting the central wall portion from opposite sides, wherein at least a first side wall portion of the covering partially or completely overlaps a second surface of the structural component, and at least a second side wall portion of the covering partially or completely overlaps a third surface of the structural component, which lies opposite the second surface of the structural component, and comprises an inside of the covering facing the structural component, in particular the central wall portion, the first side wall portion and/or the second side wall portion or comprises a plurality of protruding ribs, which are designed to come in contact with the at least one switching strip in such a way that the one or more protruding ribs actuate the at least one switching strip when the covering moves relative to the structural component and/or an outer side of the structural component facing the covering, in particular the first surface, the second surface and/or the third surface, comprising one or more protruding ribs that are formed to come in contact with the at least one switching strip in such a way that the one or more protruding ribs actuate the at least one switching strip when the covering moves relative to the structural component.

The contact surface between the covering, which can be provided with ribs, for example, and the switching strips are another parameter that influences the sensitivity of the switching strips. Various embodiment variants with ribs are described below. These embodiment variants are exemplary and can vary in geometry. The key message is that the actuating force to be applied varies with the surface of the covering that rests on the switching strip. The larger the contact surface between the covering and the switching strip, the greater the actuation force that is required. Since the ribs are changed in terms of their support surfaces with respect to the switching strips, the triggering sensitivity of the switching strips can be varied without the switching strips themselves having to be structurally changed or replaced by others.

In a first embodiment variant, a plurality of ribs can be arranged next to one another in a linear chain, for example, in the form of diamonds or crosses on the covering, with the chain extending along the longitudinal extensions of the switching strips. In such an arrangement, only short portions of each leg of the diamond-shaped or cross-shaped structures of the ribs rest on the switching strips.

In a second embodiment variant, the plurality of ribs can be arranged next to one another in a linear chain, for example, in the form of diamonds or crosses on the covering with the chain extending along the longitudinal extensions of the switching strips. In such an arrangement, both the short portions of each leg of the diamond-shaped or cross-shaped structures of the ribs rest on the switching strips and, in addition, two legs of the diamond-shaped or cross-shaped structures of the ribs are provided with additional webs that also rest on the switching strips. The additional webs are, however, only arranged between two legs each with the respective adjacent pairs of legs being formed without additional webs, i.e., the respective adjacent pairs of legs remaining free. The additional webs extend along the longitudinal extensions of the switching strips.

In a third embodiment variant, the plurality of ribs can be arranged next to one another in a linear chain, for example, in the form of diamonds or crosses on the covering with the chain extending along the longitudinal extensions of the switching strips. In such an arrangement, both the short portions of each leg of the diamond-shaped or cross-shaped structures of the ribs rest on the switching strips, and, in addition, two legs each of the diamond-shaped or cross-shaped structures of the ribs are provided with additional webs that also rest on the switching strips. In the third embodiment variant, the additional webs are not only arranged between two legs each, as in the second embodiment variant, with the respective adjacent pairs of legs being formed without additional webs, i.e., the respective adjacent pairs of legs remaining free, but with all legs or pairs of legs being connected with webs so that, in this respect, the result is a web that runs through all transverse ribs and extends at least almost completely over the length of the associated switching strip. The additional webs extend along the longitudinal extensions of the switching strips.

A particularly advantageous embodiment of the overall system can be achieved by providing ribs on the structural component or on the covering. The contact surface between the covering, which can be provided with ribs, for example, and the switching strips is a further parameter which influences the sensitivity of the switching strips. The larger the contact surface between the covering and the switching strip, the greater the force required for an actuation. The actuating force can be varied in a targeted manner by means of the geometry of the ribs. The switching strip does not have to be changed. In addition, the ribs ensure that the switching strip is always triggered in the event of a collision, regardless of where the force is applied on the covering. A cleverly arranged rib pattern also provides the covering with sufficient rigidity and at the same time a light and compact design, and the force is transmitted from the force entry point to the contact surface of the ribs on the switching strip.

The covering and/or the structural component can comprise at least one illuminant, in particular an LED, which is connected to a control device of the robot, with the control device being configured to optically display a signal indicating the triggered state of the switching strip through a controlling of the illuminant, in particular the LED on the robot arm, when the switching strip is triggered and thus actuated.

Specific embodiments of the invention are explained in more detail in the following descriptions with reference to the accompanying figures. Specific features of these exemplary embodiments, possibly considered individually or in further combinations, can represent general features of the invention regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
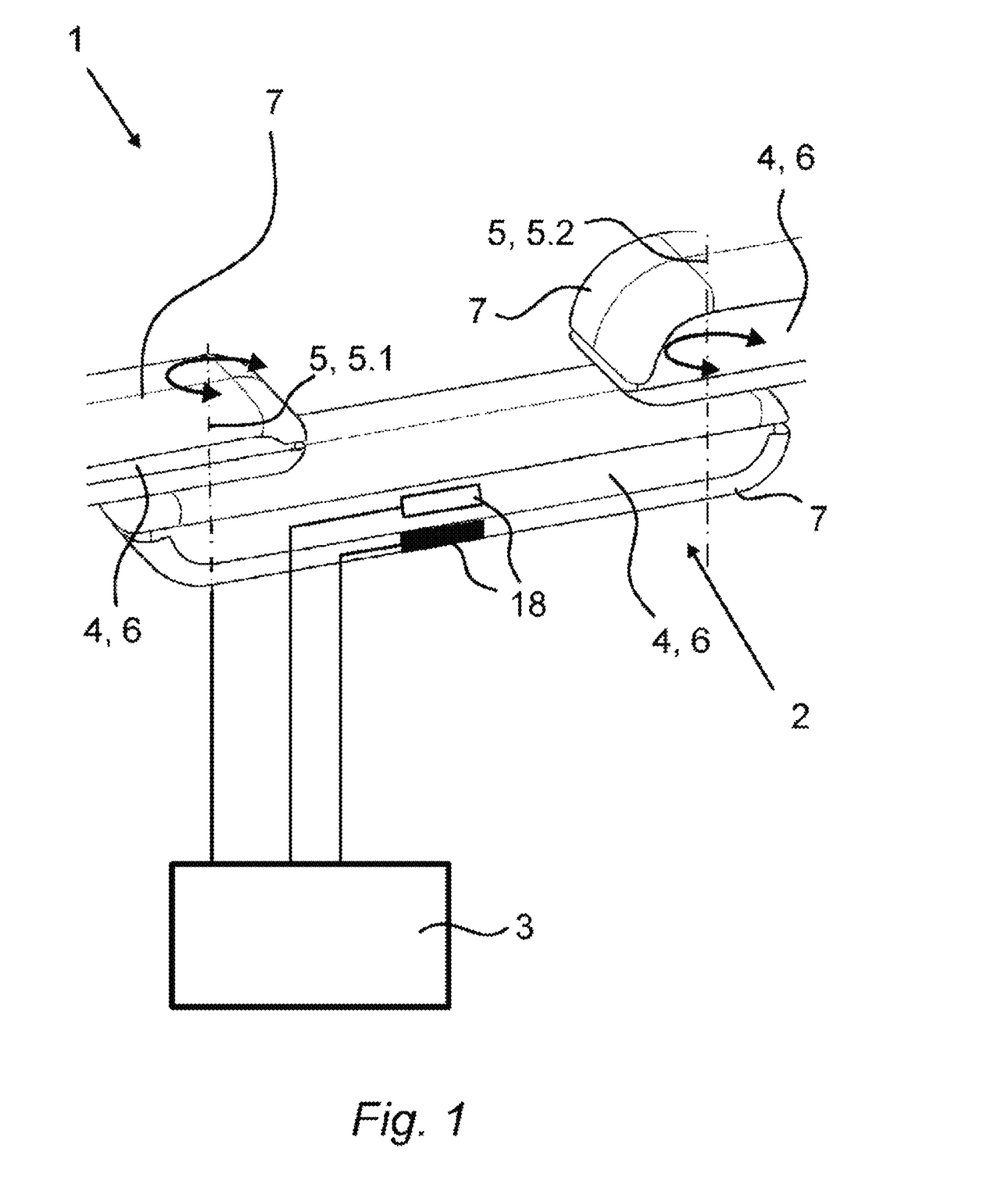
FIG. 1 is a representation of an exemplary robot arm with a plurality of joints and links connecting these joints.

FIG. 1 is a representative embodiment of a robot 1 with a robot arm 2 and an associated control device 3. The robot arm 2 comprises a plurality of links 4 and joints 5 which adjust the links 4 relative to one another. Each joint 5 is driven by a joint motor of the robot arm 2. The control device 3 is formed and configured for controlling the joint motors in order to move the links 4 of the robot arm 2 by automatically adjusting the joints 5.

Accordingly, the robot arm 2 comprises a plurality of motor-driven joints 5 and a plurality of links 4, each of which interconnect two adjacent joints 5 of these driven joints 5, wherein at least one of these links 4 comprises a supporting structural component 6 that is designed to transmit movements, forces and/or torques from an adjacent joint 5.1 to the other adjacent joint 5.2.

As shown, in particular, in FIGS. 2 to 7 in different embodiment variants, at least one of the structural components 6 in the robot arm 2 comprises a covering 7 that at least partially covers the assigned structural component 6 and at least one contact sensor 8. According to the invention, the at least one contact sensor 8 is designed as a switching strip 8.1 that is arranged between the structural component 6 and the covering 7. A spring-preloaded, movable mounting of the covering 7 on the structural component 6, which is spring-loaded into the respective basic position (FIG. 2, FIG. 4, FIG. 6) of the covering 7, occurs due to an inherent elasticity of the at least one switching strip 8.1.

The covering 7 comprises a central wall portion 7.3, which is designed to cover a first surface 6.1 of the structural component 6 and comprises at least two side wall portions 7.1, 7.2 that delimit the central wall portion 7.3 from opposite sides, wherein at least a first side wall portion 7.1 of the covering 7 partially or completely overlaps a second surface 6.2 of the structural component 6 and at least one second side wall portion 7.2 of the covering 7 partially or completely overlaps a third surface 6.3 of the structural component 6, which is opposite the second surface 6.2 of the structural component 6.

According to the embodiments of FIGS. 2 to 5, the second surface 6.2 of the structural component 6 comprises at least one first projection 9.1, which cooperates with a first undercut 10.1 on the inside of the first side wall portion 7.1 of the covering 7 in order to prevent the covering 7 secured in its basic position (FIG. 2, FIG. 4) on the structural component 6 from detaching from the structural component 6 in a spring-preloaded manner.

As an alternative or in addition, the third surface 6.3 of the structural component 6 can comprise at least one second projection 9.2 which cooperates with a second undercut 10.2 on the inside of the second side wall portion 7.2 of the covering 7 in order to prevent the covering 7 secured in its basic position (FIG. 2, FIG. 4) on the structural component 6 from detaching from the structural component 6 in a spring-preloaded manner.

Figure 2:
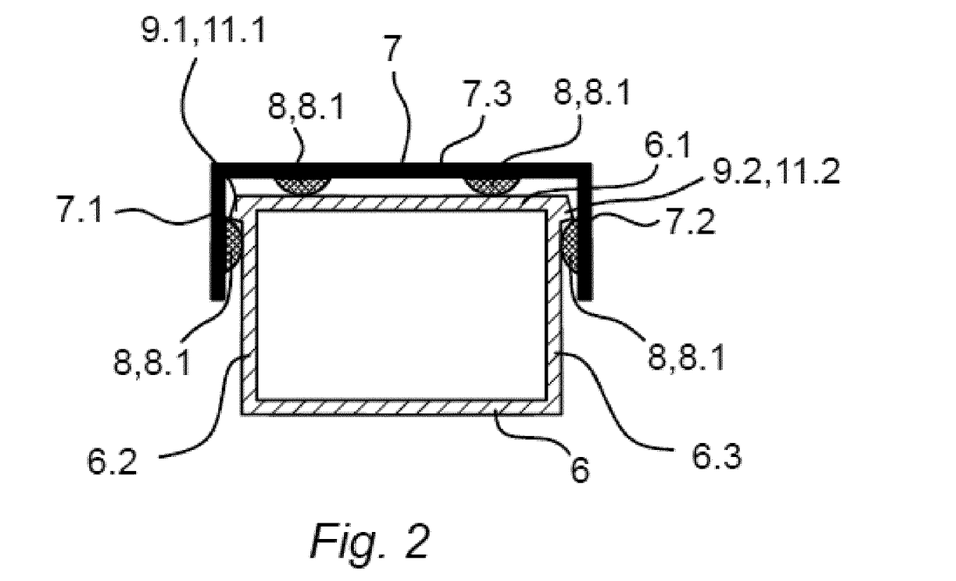
FIG. 2 is a schematic representation with a sectional view of a first embodiment of a structural component and a covering with projections molded on the structural component in a basic position.
Figure 3:
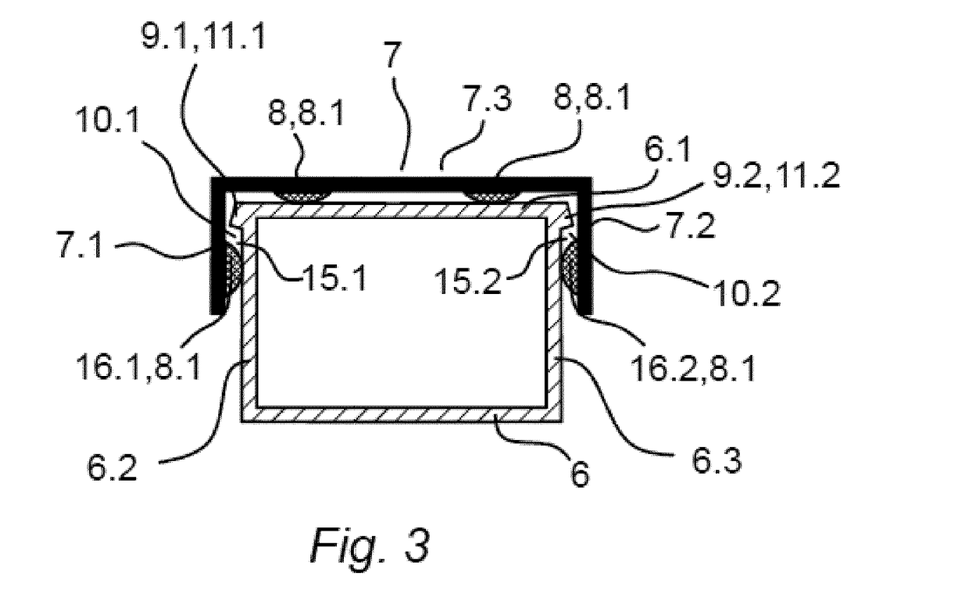
FIG. 3 is a schematic representation with a sectional view of the first embodiment of the structural component and the covering with projections molded on the structural component, according to FIG. 2, in a pressed collision position.

In the embodiment shown in FIGS. 2 and 3, the first projection 9.1 of the structural component 6 is formed by a first guide element 11.1 integrally molded on the structural component 6, and the second projection 9.2 of the structural component 6 is formed by a second guide element 11.2 that is integrally molded on the structural component 6. In the modified embodiment shown in FIGS. 4 and 5, however, the first projection 9.1 of the structural component 6 is formed by a separately formed first guide element 12.1 fastened to the structural component 6, and the second projection 9.2 of the structural component 6 is formed by a second guide element 12.2 that is formed separately and fastened to the structural component 6.

Figure 4:
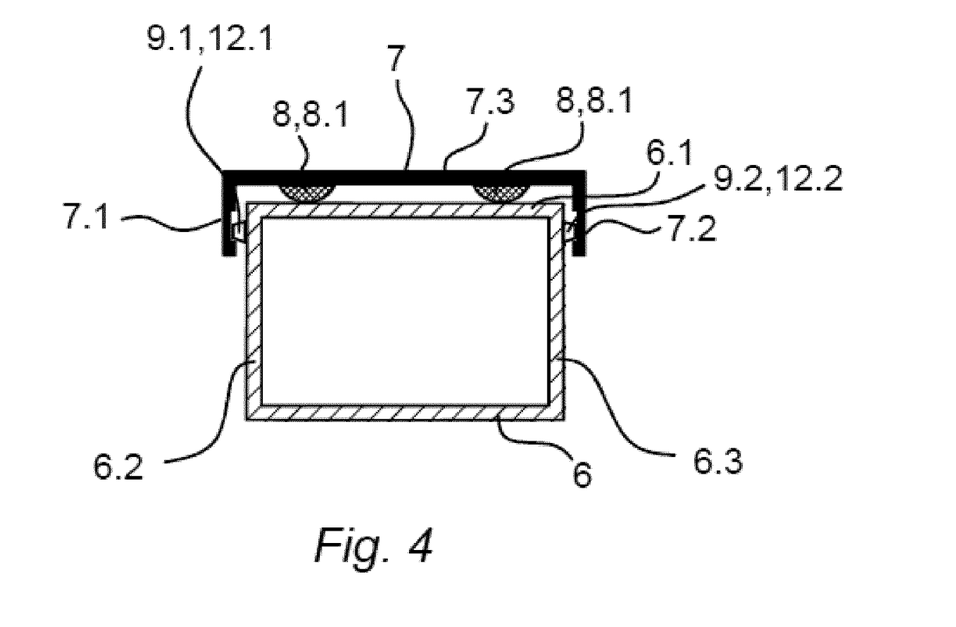
FIG. 4 is a schematic representation with a sectional view of a second embodiment of a structural component and a covering with separate projections on the structural component in a basic position.
Figure 5:
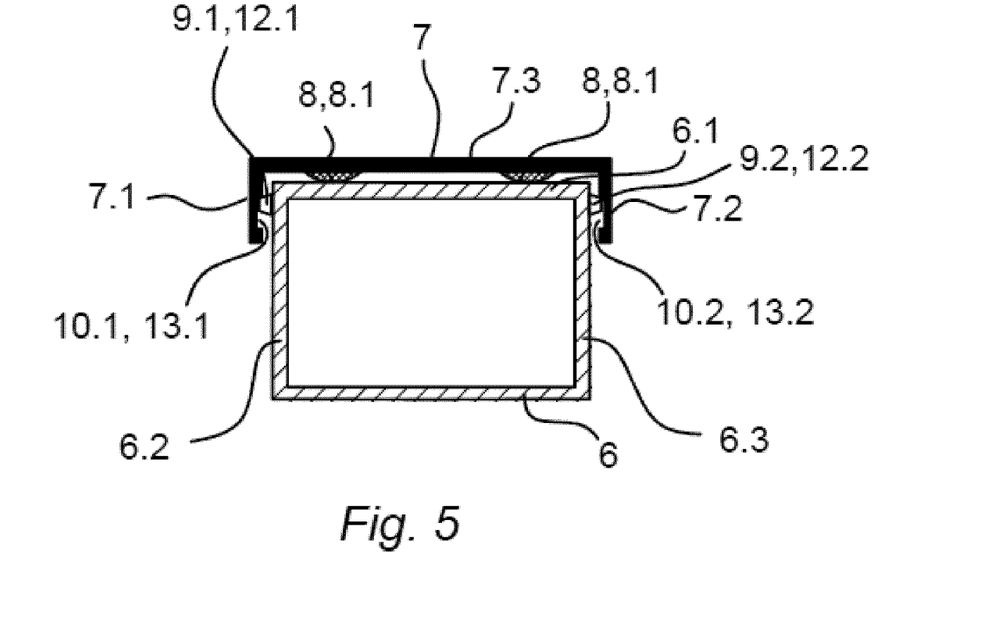
FIG. 5 is a schematic representation with a sectional view of the second embodiment of the structural component and the covering with separate projections on the structural component, according to FIG. 4, in a compressed collision position.

As shown in FIGS. 4 and 5, in the case of this embodiment, the first undercut 10.1 of the covering 7 encompassing the first guide element 12.1 is formed by a first groove 13.1 of the first side wall portion 7.1, and the second undercut 10.2 of the covering 7 encompassing the second guide element 12.2 is formed by a second groove 13.2 of the first side wall portion 7.1.

Figure 6:
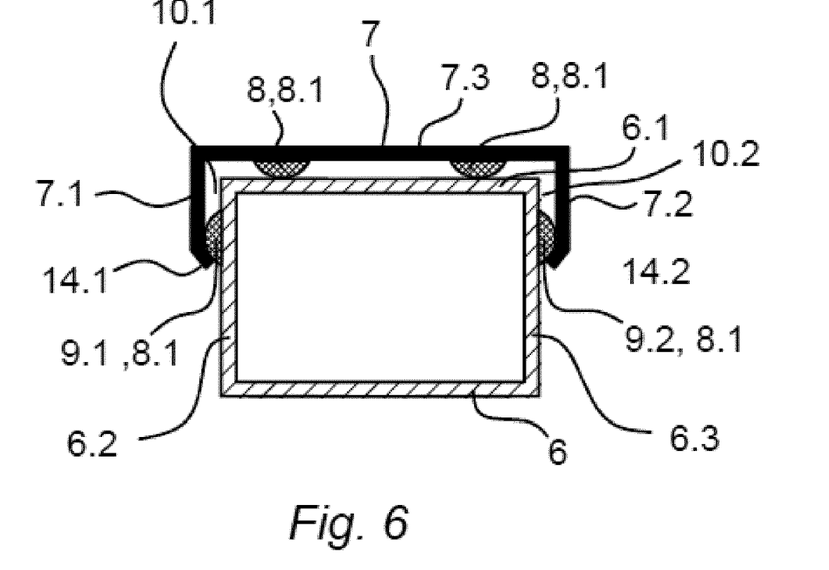
FIG. 6 is a schematic representation with a sectional view of a third embodiment of a structural component and a covering with side switching strips on the structural component in a basic position.
Figure 7:
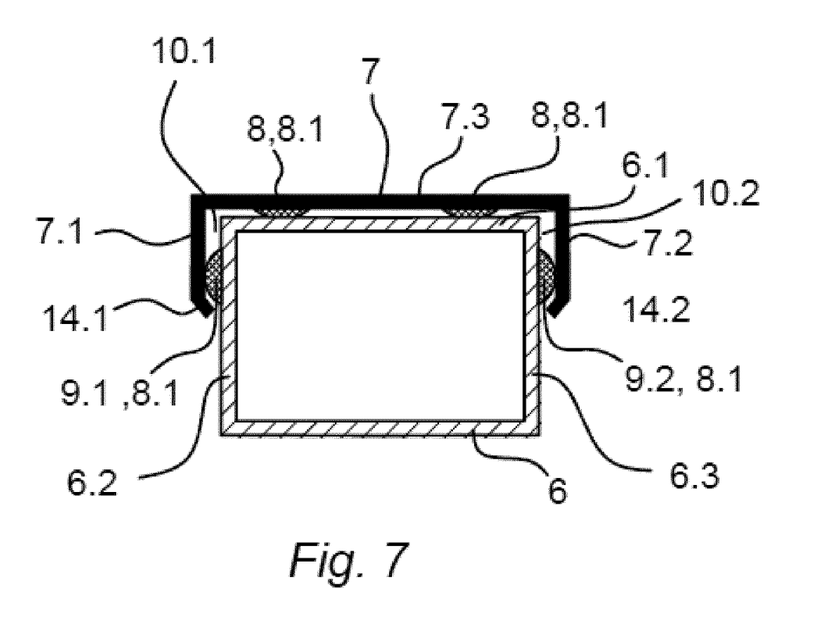
FIG. 7 is a schematic representation with a sectional view of the third embodiment of the structural component and the covering with side switching strips on the structural component, according to FIG. 6, in a compressed collision position.

In FIGS. 4 and 5, the first groove 13.1 can optionally also be formed by a first bent portion 14.1 analogous to FIGS. 6 and 7, and the second groove 13.2 can be replaced by a second bent portion 14.2 analogous to FIGS. 6 and 7.

In the embodiment according to FIG. 6 and FIG. 7, the first projection 9.1 of the structural component 6 is formed by a first switching strip 8.1 fastened to the structural component 6 with the first undercut 10.1 of the covering 7 encompassing the first switching strip 8.1 being formed by a first bent portion 14.1 of the first side wall portion 7.1, and the second projection 9.2 of the structural component 6 is formed by a second switching strip 8.2 fastened on the structural component 6 with the second undercut 10.2 of the covering 7 encompassing the second switching strip 8.2 being formed by a second bent portion 14.2 of the second side wall portion 7.2.

The first switching strip 8.1 and/or the second switching strip 8.2 is connected to the control device 3 (FIG. 1) of the robot 1, which is designed to generate a signal that indicates an error status when the covering 7 is detached from the structural component 6, and, in the process, the first bent portion 14.1 of the first side wall portion 7.1 of the covering 7 actuates the first switching strip 8.1, or the second bent portion 14.2 of the second side wall portion 7.2 of the covering 7 actuates the second switching strip 8.2. These switching strips not only detect if, for example, the covering is detached but also generally if there is a contact or a collision.

Returning to FIGS. 2 and 3, in the embodiment shown there, the covering 7 comprises a central wall portion 7.3 which is designed to cover a first surface 6.1 of the structural component 6 and comprises at least two side wall portions 6.2 and 6.3 delimiting the central wall portion 7.3 from opposite sides, wherein at least a first side wall portion 7.1 of the covering 7 partially overlaps a second surface 6.2 of the structural component 6, in the case of the present exemplary embodiment, and at least a second side wall portion 7.2 of the covering 7 partially overlaps a third surface 6.3 of the structural component 6, which is opposite the second surface 6.2 of the structural component 6, in the case of the present embodiment.

Due to the integrally formed first guide element 11.1, the second surface 6.2 of the structural component 6 comprises a first undercut 15.1, which cooperates with a first projection 16.1 formed on the inside of the first side wall portion 7.1 of the covering 7, which is formed by a first switching strip 8.1 in order to prevent the covering 7 secured in its basic position on the structural component 6 from detaching from the structural component 6 in a spring-preloaded manner. The third surface 6.3 of the structural component 6 also comprises a second undercut 15.2 in this embodiment, which cooperates with a second projection 16.2 formed on the inside of the second side wall portion 7.2 of the covering 7, which is formed by a second switching strip 8.1, in order to prevent the covering 7 secured in its basic position on the structural component 6 from detaching from the structural component 6 in a spring-preloaded manner. The covering 7 with its side switching strips 8.1 fastened as two projections 16.2 to the first side wall portion 7.1 and the second side wall portion 7.2 delimit the first undercut 10.1 and the second undercut 10.2 in this regard.

The first switching strip 8.1 and/or the second switching strip 8.1 are connected to the control device 3 (FIG. 1) of the robot 1, which is designed to generate a signal that indicates an error status when the covering 7 is detached from the structural component 6 and, in the process, actuates the first undercut 15.1 of the second surface 6.2 of the structural component 6 or, due to the integrally formed first guide element 11.1, the first switching strip 8.1 of the covering 7 and/or the second undercut 15.2 of the third surface 6.3 of the structural component 6 or, due to the integrally formed second guide element 11.2, the second switching strip 8.1 of the covering 7.

In all embodiments, the covering 7 can comprise an inside facing the structural component 6, i.e., in particular the central wall portion 7.3, of the first side wall portion 7.1 and/or the second side wall portion 7.2, each on the inside, comprise one or more protruding ribs 17, which are formed to remain in contact with the at least one switching strip 8.1 in such a way that the one or more protruding ribs 17 actuate the at least one switching strip 8.1 when the covering 7 moves relative to the structural component 6.

Alternatively or additionally, an outer side of the structural component 6 facing the covering 7, in particular the first surface 6.1, the second surface 6.2 and/or the third surface 6.3, can also comprise one or more protruding ribs 17 that are formed to be in contact with at least one switching strip 8.1 in such a way that the one or more protruding ribs 17 actuate the at least one switching strip 8.1 when the covering 7 moves relative to the structural component 6.

Figure 8:
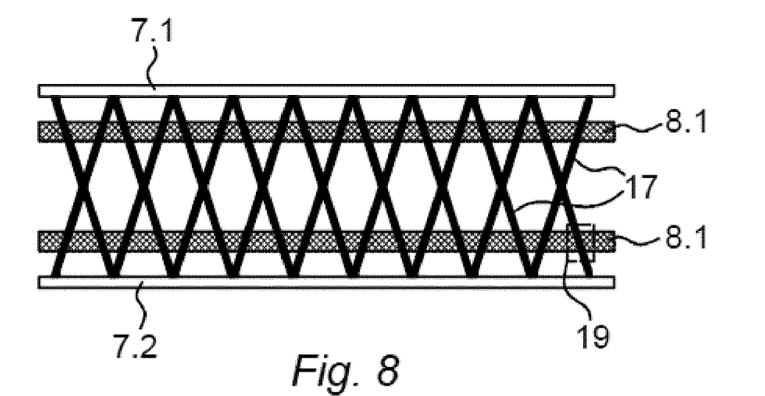
FIGS. 8-10 are schematic representations of various embodiments of protruding ribs on an inside of the covering.

In the first embodiment variant according to FIG. 8, a plurality of ribs 17 are arranged next to one another in a linear chain on the covering 7, for example, in the form of diamonds or crosses, or in any other geometry, with the chain extending along the longitudinal extensions of the switching strips 8.1. In such an arrangement according to FIG. 8, only short portions of each leg of the diamond-shaped or cross-shaped structures of the ribs 17 rest on the switching strips 8.1, as indicated by the frame 19 shown in dashed lines.

Figure 9:
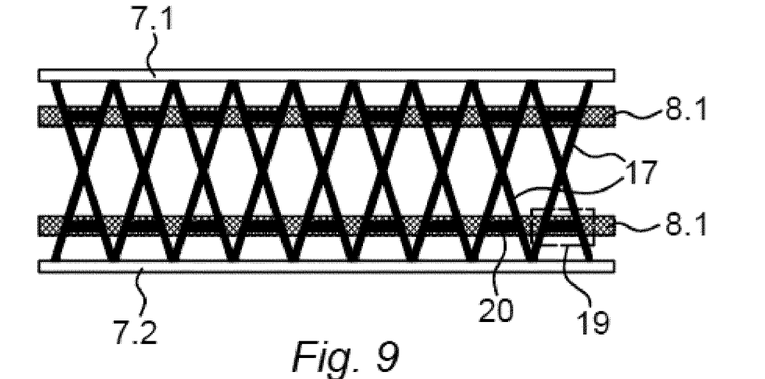

In the second embodiment, according to FIG. 9, the plurality of ribs 17 are arranged on the covering 7 next to one another in a linear chain, for example, in the form of diamonds or crosses with the chain extending along the longitudinal extensions of the switching strips 8.1. In such an arrangement according to FIG. 9, as indicated by the dashed frame 19, both the short portions of each leg of the diamond-shaped or cross-shaped structures of the ribs 17, as in the version according to FIG. 8, rest on the switching strips 8.1. In addition, two legs of the diamond-shaped or cross-shaped structures of the ribs 17 are provided with additional webs 20, which also rest on the switching strips 8.1. The additional webs 20 are, however, only arranged between two legs each with the respective adjacent pairs of legs being formed without additional webs 20, i.e., the respective adjacent pairs of legs remaining free.

Figure 10:
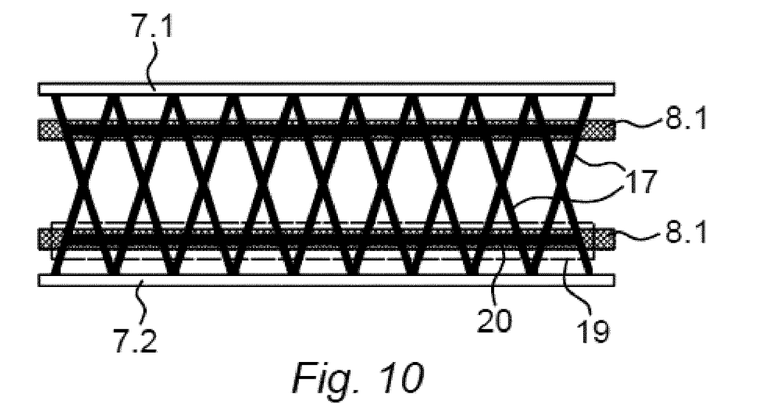

In the third embodiment according to FIG. 10, the plurality of ribs 17 are arranged on the covering 7 next to one another in a linear chain, for example, in the form of diamonds or crosses with the chain extending along the longitudinal extensions of the switching strips 8.1. In such an arrangement according to FIG. 10, as indicated by the dashed frame 19, both the short portions of each leg of the diamond-shaped or cross-shaped structures of the ribs 17 rest, as in the version according to FIG. 8, on the switching strips 8.1. In addition, two legs of the diamond-shaped or cross-shaped structures of the ribs 17 are provided with additional webs 20, which also rest on the switching strips 8.1. In the third embodiment variant according to FIG. 10, the additional webs 20 are, not only as in FIG. 19, arranged between two legs each with the respective adjacent pairs of legs being formed without additional webs 20, i.e., the respective adjacent pairs of legs remaining free, but with all legs or pairs of legs being connected with webs 20 so that, in this respect, the result is a web 20 that runs through all transverse ribs 17 and extends at least almost completely over the length of the associated switching strip 8.1, as indicated, in particular, by the dashed frame 19 in FIG. 10. The ribs or the support surfaces can be varied as needed, depending on the requirements.

As shown schematically in FIG. 1, the covering 7 and/or the structural component 6 comprise at least one illuminant 18, in particular an LED, which is connected to the control device 3 of the robot 1, with the control device 3 being configured to optically display a signal indicating the triggered state of the switching strip 8.1 through a controlling of the illuminant 18, in particular the LED on the robot arm 2, when the switching strip 8.1 is triggered and thus actuated.

Figure 11:
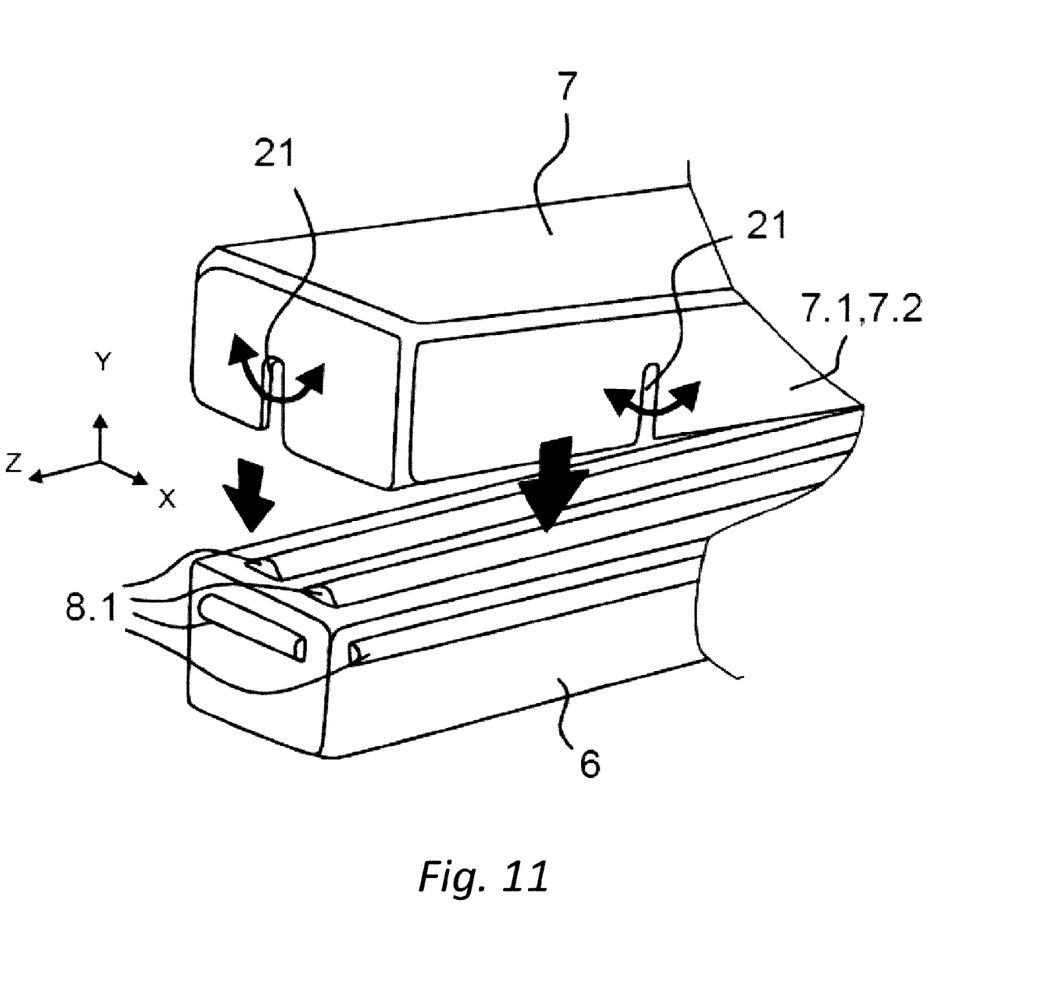
FIG. 11 is an exploded perspective view of an exemplary structural component, which has a plurality of switching strips, with a covering shortly before it is mounted and with a defined shape for an easy assembly.

FIG. 11 provides a perspective view of an exemplary structural component 6, which is shown in a simplified form as a cuboid, and a hood-like covering 7 during an assembly movement (arrows). The structural component 6 comprises on its first surface 6.1 facing upward in FIG. 11 two switching strips 8.1 which are arranged at a distance from one another and extend parallel to one another. The long, second surface 6.2 pointing forward in FIG. 11 comprises a single switching strip 8.1. The long third surface 6.3, which is not visible in FIG. 11 and is opposite the second surface 6.1, also comprises a single switching strip 8.1. In addition, the short surface pointing forward in FIG. 11 also comprises a short switching strip 8.1, and the short surface, which is not visible and opposite the short front surface, comprises a short switching strip 8.1 as well. As shown in FIG. 11, the side wall portions 7.1, 7.2 of the covering 7 can be provided with slots 21. By means of the slots 21, the elasticity of the side wall portions 7.1, 7.2 can be increased locally in a targeted manner in order to be able to snap or latch the covering 7 onto the structural component 6 in a simple manner.

In addition to a two-dimensional collision monitoring, the three-dimensional axis state can, as shown by the embodiment according to FIG. 11, be monitored through a sensible arrangement of the components, without having to use a three-dimensional force sensor. All that is required is to provide the covering on the structural component and the switching strips in the corresponding directions. A possible arrangement is depicted in FIG. 11. As described, the switching strips are arranged in the x-direction and the y-direction. In addition, further switching strips with a triggering direction in the z-direction can be attached. In order to be mounted on the structural component, the covering can be slotted at useful points so that the flexibility necessary for an assembly is provided by means of a type of solid-state joint.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot, comprising:
   a robot arm having a plurality of motor-driven joints and a plurality of links, each link interconnecting two adjacent joints;
   at least one of the plurality of links comprises a supporting structural component configured to transmit at least one of forces or torques from an adjacent joint to the other adjacent joint; and
   at least one covering on the structural component, the covering at least partially covering the structural component and at least one contact sensor;
   wherein the at least one contact sensor is configured as a switching strip arranged between the structural component and the covering; and
   wherein the covering is movably mounted on the structural component and is spring-loaded into an initial position, the covering being adjustable by an inherent elasticity of the switching strip;
   wherein the covering comprises a central wall portion configured to cover a first surface of the structural component, and comprises at least two side wall portions that delimit the central wall portion from opposite sides;
   at least a first side wall portion of the covering at least partially overlaps a second surface of the structural component;
   at least a second side wall portion of the covering at least partially overlaps a third surface of the structural component which is opposite the second surface of the structural component; and
   at least one of:
   the second surface of the structural component comprises at least one first projection that cooperates with a first undercut on the inside of the first side wall portion of the covering in order to keep the covering spring-loaded in its initial position on the structural component, and thereby prevent the covering from detaching from the structural component, or
   the third surface of the structural component comprises at least one second projection that cooperates with a second undercut on the inside of the second side wall portion of the covering in order to hold the covering spring-loaded in its initial position on the structural component, and thereby prevent the covering from detaching from the structural component.

2. The robot of claim 1, wherein at least one of:
   the first projection of the structural component comprises a first guide element that is integrally formed on the structural component, or is a separately formed first guide element that is fastened on the structural component, and the first undercut of the covering that encompasses the first guide element is formed as a first bent portion or a first groove of the first side wall portion; or the second projection of the structural component comprises a second guide element that is integrally formed on the structural component, or is a separately formed second guide element that is fastened on the structural component, and the second undercut of the covering that encompasses the second guide element is formed by a second bent portion or a second groove of the second side wall portion.

3. The robot of claim 1, wherein at least one of:
the first projection of the structural component is formed by a first switching strip fastened to the structural component, and the first undercut of the covering that encompasses the first switching strip is formed by a first bent portion of the first side wall portion; or
the second projection of the structural component is formed by a second switching strip fastened on the structural component, and the second undercut of the covering that encompasses the second switching strip is formed by a second bent portion of the second side wall portion.

4. The robot of claim 3, wherein:
at least one of the first switching strip or the second switching strip is connected to a control device of the robot;
the control device is configured to generate a signal that indicates an error status when the covering is detached from the structural component; and
when the covering is detached from the structural component, at least one of:
the first bent portion of the first side wall portion of the covering actuates the first switching strip, or
the second bent portion of the second side wall portion of the covering actuates the second switching strip.

5. A robot, comprising:
a robot arm having a plurality of motor-driven joints and a plurality of links, each link interconnecting two adjacent joints;
at least one of the plurality of links comprises a supporting structural component configured to transmit at least one of forces or torques from an adjacent joint to the other adjacent joint; and
at least one covering on the structural component, the covering at least partially covering the structural component and at least one contact sensor;
wherein the at least one contact sensor is configured as a switching strip arranged between the structural component and the covering; and
wherein the covering is movably mounted on the structural component and is spring-loaded into an initial position, the covering being adjustable by an inherent elasticity of the switching strip;
wherein the covering comprises a central wall portion configured to cover a first surface of the structural component, and comprises at least two side wall portions that delimit the central wall portion from opposite sides;
at least a first side wall portion of the covering at least partially overlaps a second surface of the structural component;
at least a second side wall portion of the covering at least partially overlaps a third surface of the structural component which is opposite the second surface of the structural component; and
at least one of:
the second surface of the structural component comprises at least one undercut that cooperates with a first projection that is formed by a first switching strip on the inside of the first side wall portion of the covering in order to keep the covering spring-loaded in its initial position on the structural component and thereby prevent the covering from detaching from the structural component, or
the third surface of the structural component comprises at least one second undercut that cooperates with a second projection that is formed by a second switching strip on the inside of the second side wall portion of the covering in order to keep the covering spring-loaded in its initial position on the structural component and thereby prevent it from detaching from the structural component.

6. The robot of claim 5, wherein:
at least one of the first switching strip or the second switching strip is connected to a control device of the robot;
the control device is configured to generate a signal that indicates an error status when the covering is detached from the structural component; and
when the covering is detached from the structural component, at least one of:
the first undercut of the second surface of structural component actuates the first switching strip of the covering, or
the second undercut of the third surface of the structural component actuates the second switching strip of the covering.

7. The robot of claim 1, wherein the at least one switching strip is configured as an electromechanical switch comprising at least one electrical conductor which is embedded in an electrically insulating profile made of an elastic material.

8. A robot, comprising:
a robot arm having a plurality of motor-driven joints and a plurality of links, each link interconnecting two adjacent joints;
at least one of the plurality of links comprises a supporting structural component configured to transmit at least one of forces or torques from an adjacent joint to the other adjacent joint; and
at least one covering on the structural component, the covering at least partially covering the structural component and at least one contact sensor;
wherein the at least one contact sensor is configured as a switching strip arranged between the structural component and the covering; and
wherein the covering is movably mounted on the structural component and is spring-loaded into an initial position, the covering being adjustable by an inherent elasticity of the switching strip;
wherein the covering comprises a central wall portion configured to cover a first surface of the structural component, and comprises at least two side wall portions delimiting the central wall portion from opposite sides;
at least a first side wall portion of the covering at least partially overlaps a second surface of the structural component;
at least a second side wall portion of the covering at least partially overlaps a third surface of the structural component which is opposite the second surface of the structural component; and
at least one of:
an inside portion of the covering that faces the structural component comprises one or more protruding ribs that are configured to come in contact with the at least one switching strip in such a way that the one or more of the protruding ribs actuate the at least one switching strip when the covering moves relative to the structural component, or an outer side of the structural component that faces the covering comprises one or more protruding ribs that are configured to come in contact with the at least one switching strip in such a way that the one or more protruding ribs actuate the at least one switching strip when the covering moves relative to the structural component.

9. The robot of claim 8, wherein at least one of:
the plurality of ribs are on an inside portion of at least one of the central wall portion, the first side wall portion, or the second side wall portion of the covering; or
the plurality of ribs are on at least one of the first surface, the second surface, or the third surface of the structural component.

10. The robot of claim 1, wherein:
at least one of the covering or the structural component comprises at least one light producing device in communication with a control device of the robot;
the control device configured to optically display, in response to a triggering actuation of the at least one switching strip, a signal indicating a triggered state of the switching strip by controlling the light producing device on the robot arm.

11. The robot of claim 10, wherein the light producing device comprises a light emitting diode (LED).

12. The robot of claim 5, wherein the at least one switching strip is configured as an electromechanical switch comprising at least one electrical conductor which is embedded in an electrically insulating profile made of an elastic material.

13. The robot of claim 5, wherein:
at least one of the covering or the structural component comprises at least one light producing device in communication with a control device of the robot;
the control device configured to optically display, in response to a triggering actuation of the at least one switching strip, a signal indicating a triggered state of the switching strip by controlling the light producing device on the robot arm.

14. The robot of claim 8, wherein the at least one switching strip is configured as an electromechanical switch comprising at least one electrical conductor which is embedded in an electrically insulating profile made of an elastic material.

15. The robot of claim 8, wherein:
at least one of the covering or the structural component comprises at least one light producing device in communication with a control device of the robot;
the control device configured to optically display, in response to a triggering actuation of the at least one switching strip, a signal indicating a triggered state of the switching strip by controlling the light producing device on the robot arm.

* * * * *